Dec. 26, 1922.
Re. 15,510
J. L. MACFARLANE.
TEXTILE MACHINE.
ORIGINAL FILED JULY 17, 1917.
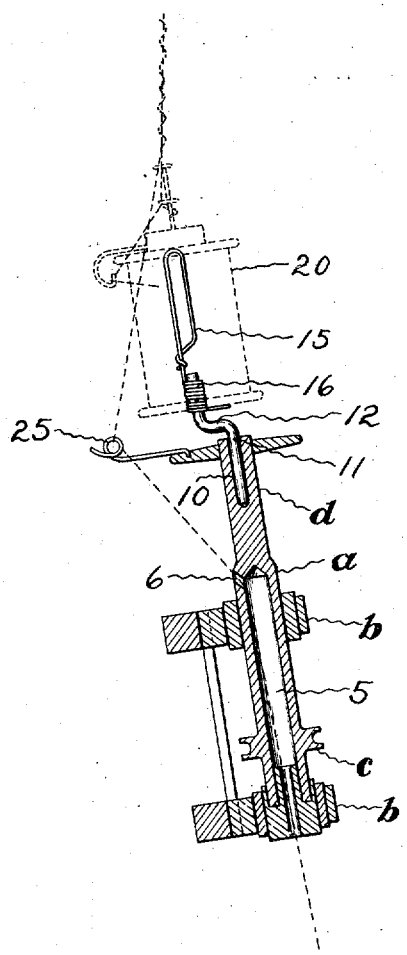
Inventor
James Lloyd Macfarlane
By H. E. Hart.
Attorney Reissued Dec. 26, 1922. Re. 15,510

UNITED STATES PATENT OFFICE.

JAMES LLOYD MACFARLANE, OF ATWOODVILLE, CONNECTICUT; HERBERT T. CLARK ADMINISTRATOR OF SAID JAMES LLOYD MACFARLANE, DECEASED.

TEXTILE MACHINE.

Original application filed February 12, 1916, Serial No. 78,013. Renewed November 17, 1916, Serial No. 131,947. Original No. 1,233,592, dated July 17, 1917. Application for reissue filed December 27, 1918. Serial No. 268,511.

*To all whom it may concern:*

Be it known that I, JAMES LLOYD MACFARLANE, a citizen of the United States, and a resident of Atwoodville, in the county of Tolland and State of Connecticut, have invented certain new and useful Improvements in Textile Machines, of which the following is a specification.

This invention relates to the novel arrangement and construction of textile spindles and the support thereby of bobbins or like devices, such as illustrated in my Patents No. 1,233,591 and No. 1,233,593.

The word "spindle" as used in the following description and claims refers to a distinctive device known by this name in the textile industry, usually supported at its lower end in suitable bearings and in upright position, though it may be more or less inclined from vertical. The object of this invention is to provide a novel spindle construction, and a novel bobbin support in connection therewith.

The drawing represents a sectional side view of a spindle made in accordance with my invention, and the bobbin holder for use therewith.

Referring to the drawing, *a* denotes what may be termed the base of the spindle mounted in suitable bearings *b* provided with a driving means, as the belt-receiving pulley *c*. *d* is the upper bobbin receiving portion of the spindle extending above the bearings.

In the base of the spindle, or such part of the spindle as lies within limits of the bearings and driving mechanism, there is a longitudinal bore, 5, and a passage 6 therefrom through the side of the spindle above the bearings, so that a strand or thread may be passed from one side of the bearings to the other through the spindle and carried outside of the spindle above the bearings through the passage 6. In the ordinary operation of a textile machine the spindle is rotated at a high rate of speed, anywhere from 8,000 R. P. M. to 11,000 R. P. M. In accordance with this invention means are provided for mounting a non-rotating bobbin on the rotating spindle, and in the embodiment of the invention illustrated in the drawing a bobbin holder is utilized the upper end of the spindle is recessed as at 10, and mounted in this recess is the base 11 of a bobbin holder, the projecting end of which is overbalanced with respect to the spindle, as for instance by off-setting it as at 12. Of course the base 11, of the holder fits loosely in the recess 10, and, in the embodiment shown, the weight of the bobbin in connection with the offset assists in holding the bobbin and its holder against rotation with the spindle. When the particular holder here shown is not utilized other means may be provided for supporting the bobbin on the spindle, and in such a way that it does not rotate.

It is found that as a result of mounting this non-rotating holder in the spindle rotating at a very high speed, the holder is subject to a certain amount of vibration, which it is desirable shall not be communicated to the bobbin, and in order to eliminate the vibration of the bobbin, a somewhat delicate resilient device is interposed between the bobbin and the holder base 11. One means for accomplishing this result is illustrated in the drawings, and comprises a bobbin receiver 15, which is yieldingly mounted, on the overbalanced end of the base 11, as by the coil spring 16. 20 denotes a bobbin or other equivalent device mounted on the receiver. The base 11 and the receiver 15 constitute what I have termed the "bobbin holder" in the embodiment here illustrated and provide a substantially non-vibratory mounting of the bobbin on the spindle. As illustrated in the drawing, the bobbin is non-rotatable although supported by the rotating spindle. The essential thing is to prevent that character of rotation of the bobbin which would put a spin in the strand as it is taken off of the bobbin. Two instances where the herein-described construction and arrangement of rotating spindle and non-rotating bobbin are of peculiar advantage are illustrated in my above-mentioned patents, in the first of which a strand is threaded upward through the spindle from one side of the bearings to the other and joined to a strand taken from the bobbin supported on the spindle. In the latter case, the strand from the bobbin mounted on the spindle is carried down through the spindle from one side of the bearings to the other.

An essential feature of this invention is the provision of means for mounting a non-rotating bobbin holder on a rotating spindle, and the carrying of a thread through the bearings inside of the spindle. These features of construction make possible the performance of certain operations, such as twisting and spinning strands and threads in ways which have not heretofore been utilized in the textile art, and represent great savings in power and labor, and produce a superior product of great uniformity.

This invention finds its peculiar utility and practicability in the textile industry, where the strands or threads which are being handled are exceedingly delicate, and where for economy the work must be done at a high speed. The moving parts, such as the spindle, must be very accurately made, very carefully balanced, and supported in carefully designed anti-friction bearings. The strands must be free from any unusual frictional drag which would impose such a tension as to cause breakage, and vibration must be overcome to as great an extent as possible. It will be observed that the spindle bearings are arranged at the lower part of the spindle, while its upper part projects above the bearings and is free and unsupported. Also, that the bobbin holder finds its sole support in the location of the base in the recess in the upper end of the spindle, providing all the essential characteristics of the mechanism adapted to the textile industry.

A conventional form of flier, 25, is shown as secured to the upper end of the spindle, and by means of which the thread passing through the lower portion of the spindle is manipulated.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

I claim as my invention:

1. In a mechanism of the character described, an upright textile spindle, suitable bearings in which the lower portion of said spindle is mounted, means for driving said spindle, a strand passage through said spindle from one side of said bearings to the other with an outlet through the wall of the spindle above said bearings, a bobbin holder comprising a base non-rotatably mounted at the upper end of said spindle and overbalanced relative thereto, and a bobbin carried by said base.

2. An upright textile spindle, suitable bearings in which the lower portion of said spindle is mounted, a passage through said spindle from one side of the bearings to the other, an outlet from said passage through the side of said spindle above the bearings, means for driving said spindle, a bobbin holder comprising a non-rotating base mounted in a recess in the upper end of said spindle and overbalanced relative thereto, a bobbin carried by said base, and vibration-reducing means interposed between said bobbin and base.

3. In a mechanism of the character described, bearings, a textile spindle with its lower portion mounted in said bearings, said spindle being of general upright arrangement but inclined slightly from the vertical, a strand passage through the lower portion of said spindle from one side of said bearings to the other, means for driving said spindle, a bobbin holder comprising a base non-rotatably mounted at the upper end of said spindle and overbalanced relative thereto, a bobbin receiver forming a part of said holder resiliently connected with said base, and a bobbin on said receiver.

4. A rotating textile spindle arranged in upright position but inclined slightly from the vertical, suitable bearings in which the lower portion thereof is mounted, a bobbin holder comprising a base non-rotatably mounted at the upper end of said spindle and overbalanced with relation thereto, a bobbin receiver, and a vibration-reducing connection between said base and receiver.

5. In a mechanism of the character described, an upright spindle inclined slightly from the vertical, suitable bearings in which the lower portion of said spindle is mounted, means for rotating said spindle, an axial passage through said spindle from one side of the bearings to the other, and a lateral passage communicating therewith, a recess formed centrally in the upper end of said spindle, a bobbin holder offset with relation to said spindle and comprising a non-rotating base located in the recess, and a bobbin receiver yieldingly connected with said base.

6. In a mechanism of the character described, a spindle inclined slightly from the vertical, bearings in which the lower portion of said spindle is mounted, said spindle having in its lower portion an axial passage from one side of said bearings to the other and terminating in a lateral opening above the bearings, and having in its upper end a centrally disposed recess, a non-rotatable bobbin carrier comprising a base having a lower portion located in said recess and an upper portion laterally offset from the axis of said spindle, and a bobbin receiver yieldingly connected with the offset portion of the base.

7. In a mechanism of the character described, a high speed textile spindle, suitable bearings in which one end of said spindle is mounted, means for driving said spindle, a strand passage through said spindle from one side of said bearings to the other with an outlet through the wall of the spindle at one side of said bearings, a bobbin holder comprising a base non-rotatably mounted at the end of said spindle beyond said outlet and overbalanced relative to the spindle, and a bobbin supported by said base.

8. In a mechanism of the character described, a high speed textile spindle provided with a passage extending longitudinally through a portion of its length and terminating in an outlet through the wall thereof, bearings for said spindle positioned at a point between the ends of said passage, and non-rotatable bobbin supporting means on said spindle at the opposite side of the outlet from said bearings.

9. In a mechanism of the character described, a textile spindle provided with a passage extending longitudinally through a portion of its length and terminating in an outlet through the wall thereof, bearings for said spindle positioned at a point between the ends of said passage, and a bobbin non-rotatably supported upon said spindle at the opposite side of the outlet from said bearings.

10. In a mechanism of the character described, a textile spindle provided with a passage extending longitudinally through a portion of its length and terminating in an outlet through the wall thereof, bearings for said spindle positioned at a point between the ends of said passage, a bobbin non-rotatably supported upon said spindle at the opposite side of the outlet from said bearings, and vibration reducing means cooperating with said bobbin.

11. In a mechanism of the character described, a rotating textile spindle, strand holding means beyond the end of said spindle, and supporting means therefor arranged axially in and extending from the end of said spindle, one of said means being non-rotatable.

12. In a mechanism of the character described, a rotating textile spindle, non-rotatable bobbin supporting means mounted axially in and extending from the end of said spindle, and a bobbin supported on said means.

13. In a mechanism of the character described, a rotating textile spindle with its axis more generally vertical than horizontal and having an axial recess in its upper end, non-rotatable bobbin supporting means mounted in said recess and extending above the end of said spindle, and a bobbin non-rotatably supported by said means.

14. In a mechanism of the character described, a rotating textile spindle, strand holding means, and supporting means therefor arranged axially in and extending from the end of said spindle, one of said means being non-rotatable, said supporting means constituting vibration reducing means for said strand holding means.

15. In a mechanism of the character described, a rotating spindle arranged with its axis generally upright but inclined slightly from the vertical, a non-rotating bobbin arranged above the end of said spindle, and means positioned at the upper end of said spindle for supporting said bobbin therefrom and including resilient vibration reducing means for said bobbin.

16. In a mechanism of the character described, a rotating spindle arranged with its axis generally upright but inclined slightly from the vertical and having an axial recess in its upper end, a base mounted in said recess and extending above the upper end of said spindle, means for preventing rotation of said base, a bobbin carried by said base, and means between said base and bobbin for reducing vibration of the latter.

JAMES LLOYD MACFARLANE.